(12) United States Patent
Lamm et al.

(10) Patent No.: US 9,625,904 B2
(45) Date of Patent: Apr. 18, 2017

(54) UNMANNED GROUND/AERIAL VEHICLE SYSTEM HAVING AUTONOMOUS GROUND VEHICLE THAT REMOTELY CONTROLS ONE OR MORE AERIAL VEHICLES

(71) Applicant: Southwest Research Institute, San Antonio, TX (US)

(72) Inventors: Ryan D. Lamm, Helotes, TX (US); Christopher I. Mentzer, San Antonio, TX (US); Kristopher C. Kozak, San Antonio, TX (US); Marc C. Alban, San Antonio, TX (US); Jason C. Gassaway, San Antonio, TX (US); Richard D. Garcia, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 14/666,707

(22) Filed: Mar. 24, 2015

(65) Prior Publication Data
US 2016/0282864 A1 Sep. 29, 2016

(51) Int. Cl.
| | |
|---|---|
| *G01C 11/06* | (2006.01) |
| *G05D 1/00* | (2006.01) |
| *B64C 39/02* | (2006.01) |
| *G05D 1/02* | (2006.01) |

(52) U.S. Cl.
CPC ......... *G05D 1/0027* (2013.01); *B64C 39/024* (2013.01); *G05D 1/028* (2013.01); *B64C 2201/146* (2013.01); *G05D 1/024* (2013.01); *G05D 1/0246* (2013.01); *G05D 1/0255* (2013.01); *G05D 1/0257* (2013.01); *G05D 2201/0207* (2013.01)

(58) Field of Classification Search
CPC .... G05D 1/0027; G01C 21/005; G01C 11/06; B64C 1/00; B64C 39/024; G01S 3/7864; A62C 3/025; G08G 5/0026; H01Q 1/28
USPC .................................. 701/2, 3, 25; 244/116
See application file for complete search history.

(56) References Cited

U.S. PATENT DOCUMENTS

| | | | | |
|---|---|---|---|---|
| 6,219,004 | B1 * | 4/2001 | Johnson .................... | H01Q 1/28 343/705 |
| 6,868,314 | B1 * | 3/2005 | Frink ........................ | B64C 1/00 244/119 |
| 9,057,609 | B2 * | 6/2015 | Yu .......................... | G08G 5/0026 |
| 2007/0250260 | A1 * | 10/2007 | Ariyur .................. | G01S 3/7864 701/519 |

(Continued)

*Primary Examiner* — Yuri Kan
(74) *Attorney, Agent, or Firm* — Livingston Law Firm

(57) ABSTRACT

An unmanned vehicle system, having at least one autonomous ground vehicle (A-GV) and at least one remote controlled aerial vehicle (RC-AV). The A-GV autonomously navigates across the ground, and on-board perception sensors, whose field of view that contains at least a portion of the ground ahead of the direction of travel of the ground vehicle as well as the RC-GV. The RC-AV flies in response to commands received from the control system of the A-GV. The RC-AV has on-board in-sky perception sensors having a field of view that contains at least a portion of the ground path to be followed by the ground vehicle. The control system of the A-GV locate the aerial vehicle, receives perception data from the on-ground perception sensors and the in-sky perception sensors, and uses combined perception data to determine a ground path for itself and for the RC-AV.

5 Claims, 7 Drawing Sheets

(56) References Cited

U.S. PATENT DOCUMENTS

| | | | |
|---|---|---|---|
| 2009/0205845 A1* | 8/2009 | Hoffman | A62C 3/025 169/43 |
| 2011/0068224 A1* | 3/2011 | Kang | B64C 39/024 244/116 |
| 2014/0257595 A1* | 9/2014 | Tillmann | G01C 11/02 701/2 |
| 2016/0018224 A1* | 1/2016 | Isler | G01C 21/005 701/25 |

* cited by examiner

UNMANNED GROUND/AERIAL VEHICLE SYSTEM HAVING AUTONOMOUS GROUND VEHICLE THAT REMOTELY CONTROLS ONE OR MORE AERIAL VEHICLES

TECHNICAL FIELD OF THE INVENTION

This invention relates to unmanned vehicles, and more particularly to control of such vehicles using a fully autonomous ground vehicle.

BACKGROUND OF THE INVENTION

Remote control (RC) ground vehicles and RC aerial vehicles are not new. There are many applications where RC ground and RC aerial vehicles have been employed to fulfill various dull, dirty, or dangerous missions.

Some RC vehicle systems use multiple RC ground and aerial vehicles, and some use a combination of both RC ground and aerial vehicles. In one type of RC ground/aerial system, one or more RC ground vehicles are used for monitoring geographic regions, such as for border surveillance, automation of agriculture operations, and construction operations. The system also uses one or more RC aerial vehicles, which have on-board sensors that extend the perception of the system to an "eye-in-the-sky" vantage point.

Conventional control of RC ground/aerial systems uses one or more human controllers for the RC vehicles. In the system of the preceding paragraph, a human operator receives and uses the perception from the RC aerial vehicle to decide how to influence the RC ground vehicle's movement. Although efforts have been made to make one or more of the unmanned vehicles autonomous, there is always a human in-the-loop, with the human fulfilling key role in perception and navigation of the RC vehicles.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As indicated in the Background, in conventional unmanned vehicle systems, "remote control" is associated with a human operator. That is, a human operator is in telecommunications with a remote unmanned vehicle. The vehicle conveys information about its environment to the human operator who then acts upon his or her observations to navigate the unmanned vehicle.

Thus, conventional RC vehicle systems, such as the RC ground/aerial system described in the Background, use a human operator. An important advancement would be to make an RC ground/aerial system that is autonomous (without humans in-the-loop). In "autonomous control", a vehicle has an on-board control system that allows it to perform its mission independently of a human operator.

A problem with implementing autonomous unmanned aerial vehicles is that low-cost unmanned aerial vehicles do not possess sufficient carrying capacity to transport both the electronics for the aerial vehicle's own autonomous navigation as well as payload sensors for eye-in-the-sky perception. Additionally, vehicles having both an on-board autonomous navigation system and on-board perception sensors are expensive.

As explained below, a feature of the invention is that "remote control" of an unmanned aerial vehicle is performed by a control system on-board an autonomous ground vehicle. That is, the "remote controller" is non human. An autonomous ground vehicle provides remote control of one or more unmanned aerial vehicles.

Unmanned ground vehicles and unmanned aerial vehicles are referred to herein as ground vehicles (GV's) and aerial vehicles (AV's), respectively. To distinguish autonomous vehicles from remote control vehicles, the prefix A- (autonomous) or RC- (remote control) is used. The RC vehicles are assumed to be remotely controlled by another vehicle that is autonomous.

Thus, the following description is directed to a system and method for removing human operators from unmanned vehicle missions. The method eliminates the need for RC aerial vehicles (RC-AVs) to have on-board perception and decision-making functions. The on-board equipment (payload) of the RC-AVs may be limited to perception sensors, actuation mechanisms for movement, and a limited communications and control system. An autonomous ground vehicle (A-GV) maintains control of and makes decisions for the RC-AVs.

This strategy effectively allows a high intelligence autonomous robot to remotely control less intelligent robot(s) without human intervention. The elimination of on-board perception and decision-making systems from the RC-AVs permits the RC-AVs to have payloads purposed for perception sensors whose acquired data can be used for navigation purposes.

Figure 1:
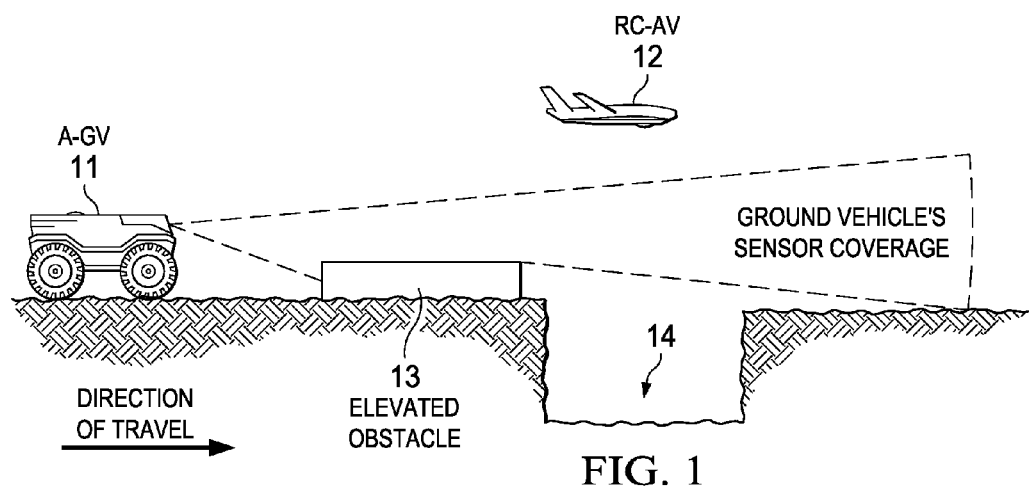
FIG. 1 illustrates an autonomous ground vehicle and a remote control aerial vehicle, and a perception area of the ground vehicle.
Figure 2:
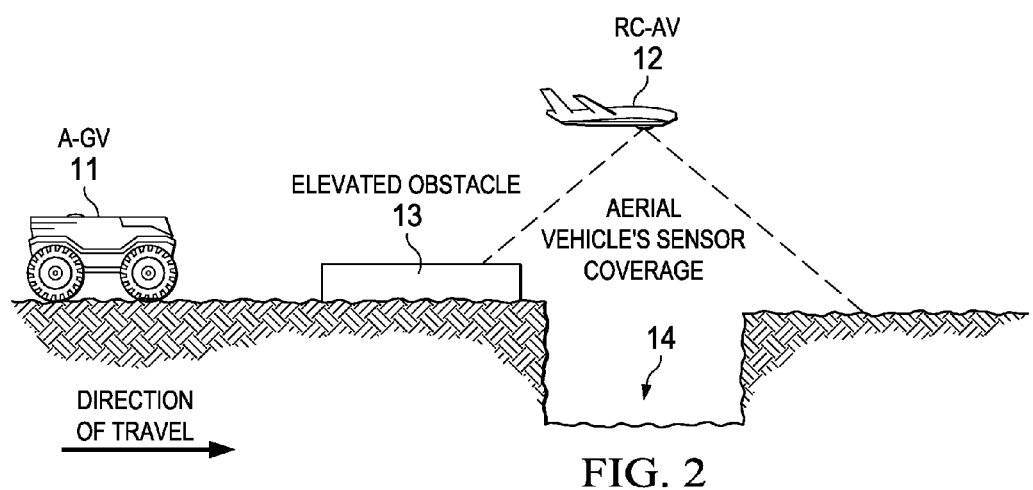
FIG. 2 illustrates an autonomous ground vehicle and a remote control aerial vehicle, and a perception area of the aerial vehicle.
Figure 3:
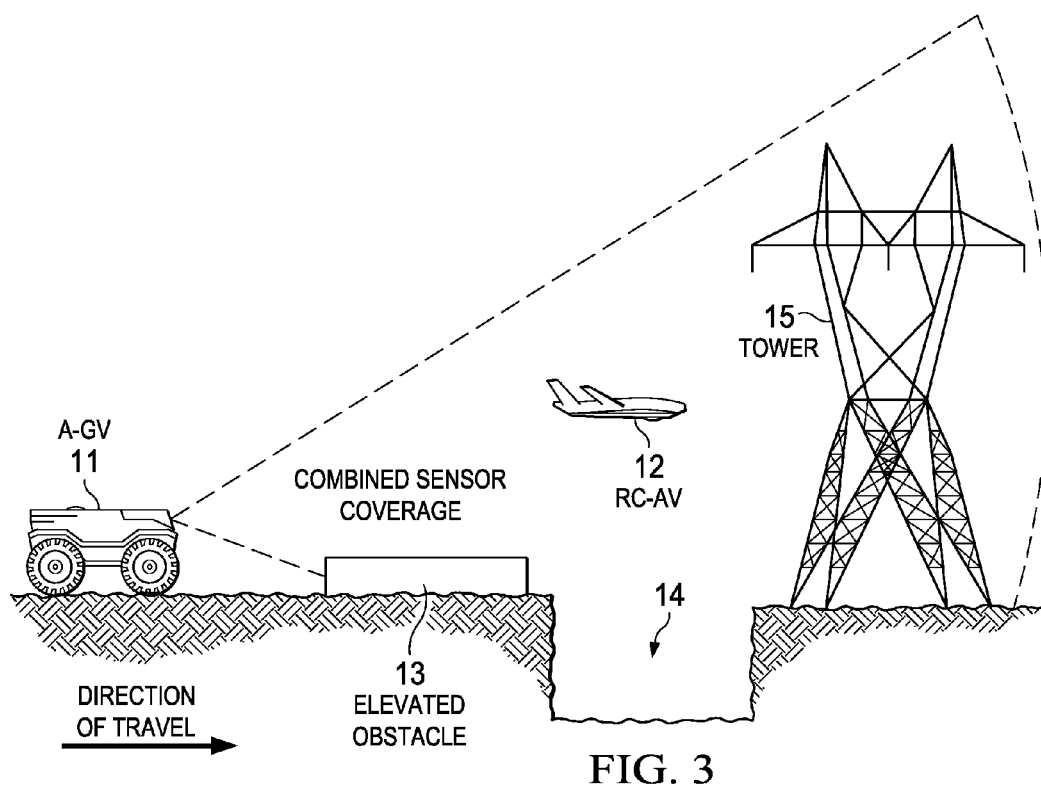
FIG. 3 illustrates an autonomous ground vehicle and a remote control aerial vehicle, and a combined and enhanced perception area used by the ground vehicle for navigation of both vehicles.

FIGS. 1-3 each illustrate an unmanned vehicle system having a single ground vehicle 11 and a single aerial vehicle 12. The ground vehicle 11 is autonomously controlled, and is therefore referred to as an A-GV. The aerial vehicle 12 is remotely controlled by the A-GV, and is therefore referred to as an RC-AV. In other words, the RC-AV is not autonomous; it is controlled by a ground vehicle that is autonomous.

As explained below, FIGS. 1 and 2 illustrate a field of view of the A-GV 11 and the RC-AV 12, respectively. Each field of view represents what is perceived by the associated vehicle's on-board perception sensor system.

For either vehicle, its on-board perception sensor system may be any type of one or more sensors that detect and convey information that constitutes an image of the environment within the sensor(s) field of view. More specifically, each sensor converts the variable attenuation of waves (as they pass through or reflect off objects) into signals that convey the information. The waves can be light or other electromagnetic radiation. Examples of suitable perception sensors are digital imaging cameras (visual, infrared or ultraviolet), as well as sensors for thermal imaging or ranging sensors, such as radar, sonar, or lidar.

In general, a "perception sensor" as used herein may be any sensor that detects objects in the sensor's field of view, and provides data that represents an image of the environment within that field of view. The A-GV and the RC-AV may have the same or different sensors or sensor arrays. The A-GV or the RC-AV may have more than one type of perception sensor.

Referring to FIG. 1, the A-GV 11 is traveling in a path on the ground indicated by the arrow. A-GV 11 has a perception sensor system that allows it to perceive this forward path. It also has a navigational system and mobility mechanisms that allow it to travel in a self-determined path along the ground. It is assumed to have all necessary mechanical equipment and processing hardware and software for performing these tasks. Various navigational and mobility systems for ground vehicles are known in the field of robotics, and may be modified and/or enhanced with the features described herein. A-GV 11 further has control and communications systems that allow it to send navigation commands to RC-AV 12.

Referring to FIG. 2, RC-AV 12 has a flight path that is above the forward direction of travel of A-GV 11. RC-AV 12 is assumed to have a perception sensor system that allows it to perceive at least part of the ground ahead of the forward path of the A-GV. It also has a navigational system and mobility mechanisms that allow it to maintain flight in a speed and direction determined by the A-GV 11, as well as a communications system that allows the A-GV 11 to send control signals to the RC-AV 12. RC-AV 12 is assumed to have all necessary mechanical equipment and processing hardware and software for performing these tasks. Various navigational, mobility systems and communications system for RC aerial vehicles are known in the fields of robotics and radio-controlled aircraft. The RC-AV may have any form of flight mechanism, such as helicopter or winged flight.

An elevated obstacle 13 is on the ground in the A-GV's direction of travel. Past the elevated obstruction, is a negative obstacle 14, such as a ditch. These obstacles are such that they may impede the A-GV's motion if not avoided.

As shown in FIG. 1, the perception sensor system on-board the A-GV has a field of view that perceives the elevated obstacle 13 in front of the A-GV. However, perception of the negative obstacle 14 by the A-GV's perception system is blocked.

FIG. 2 illustrates the field of view of only the RC-AV 11. Because the RC-AV is in motion above the ground, in a flight path or hovering, this field of view is referred to as its "current" field of view. The flight path directed by the A-GV 11 allows the RC-AV to perceive the ground ahead of the A-GV 11.

As illustrated, the field of view of the RC-AV 12 includes the negative obstacle 14. Thus, the perception system on-board RC-AV 12 perceives obstacles that cannot be perceived by the A-GV 11. Depending on the location and field of view of the RC-AV 12, it may or may not also perceive obstacles that are perceived by the A-GV 11. In the example of FIG. 2, the RC-AV 12 perceives only a portion of the elevated obstacle 13.

FIG. 3 illustrates an A-GV/RC-AV system with combined field of view that is used by the A-GV for navigation of both itself and the RC-AV. This combined field of view perceives both the elevated obstacle 13 and the negative obstacle 14.

Additionally, the field of view of the A-GV 11 is expanded to include perception of the RC-AV 12 and the environment ahead of the RC-AV's direction of travel. In the example of FIG. 3, the perception system of the A-GV perceives a tower 15 ahead of the RC-AV.

As described below in connection with FIGS. 5-10, A-GV 11 is not only autonomous, it is capable of remotely controlling RC-AV 12. In other words, A-GV has a control system that is functional to control both itself and the RC-AV. Thus, the A-GV will direct the flight path of the RC-AV so that the RC-AV avoids obstacles such as tower 15.

Figure 4:
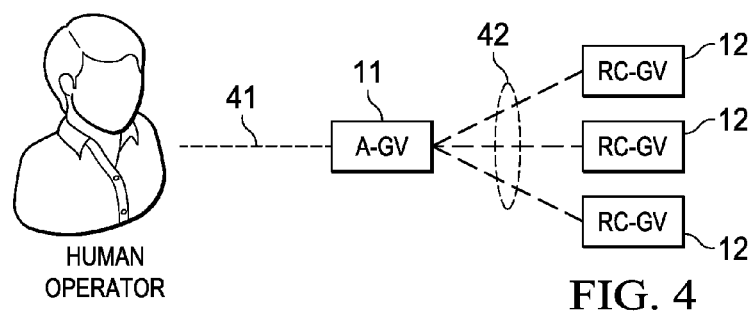
FIG. 4 illustrates a system similar to that of FIG. 3, but in which the autonomous ground vehicle remotely controls multiple aerial vehicles.

FIG. 4 illustrates another A-GV/RC-AV system similar to that of FIG. 3, but in which the A-GV 11 controls multiple RC-AV's 12. FIG. 4 further illustrates the communications links within the system.

A human operator communicates with the A-GV 11 via a long-range low-bandwidth and high-latency communications system via link 41. However, the commands from the human operator may be minimal, and used merely for initiating and ending missions, or for diagnostics or maintenance. Thus, the human communication is not considered to alter the "autonomous" characterization of the A-GV. In other words, once a mission is initiated, the A-GV is capable of performing autonomously and the human operator need have no interaction with RC-AVs 12.

The A-GV 11 communicates with the RC-AV's 12 via a shorter-range higher-bandwidth and lower latency communications system via links 42. An example of a suitable communication system is a Wi-Fi system, but other wireless radio communications systems could be used.

In general, A-GV 11 is suited for high computational loads, has a more extensive sensor array for navigation, and can operate from a stand-off distance. In contrast, the RC-AV's 12 are typically expendable and therefore do not have extensive computing resources or sensors. The primary function of the RC-AV's 12 is to carry a specialized modular payload and not navigation and control equipment.

Figure 5:
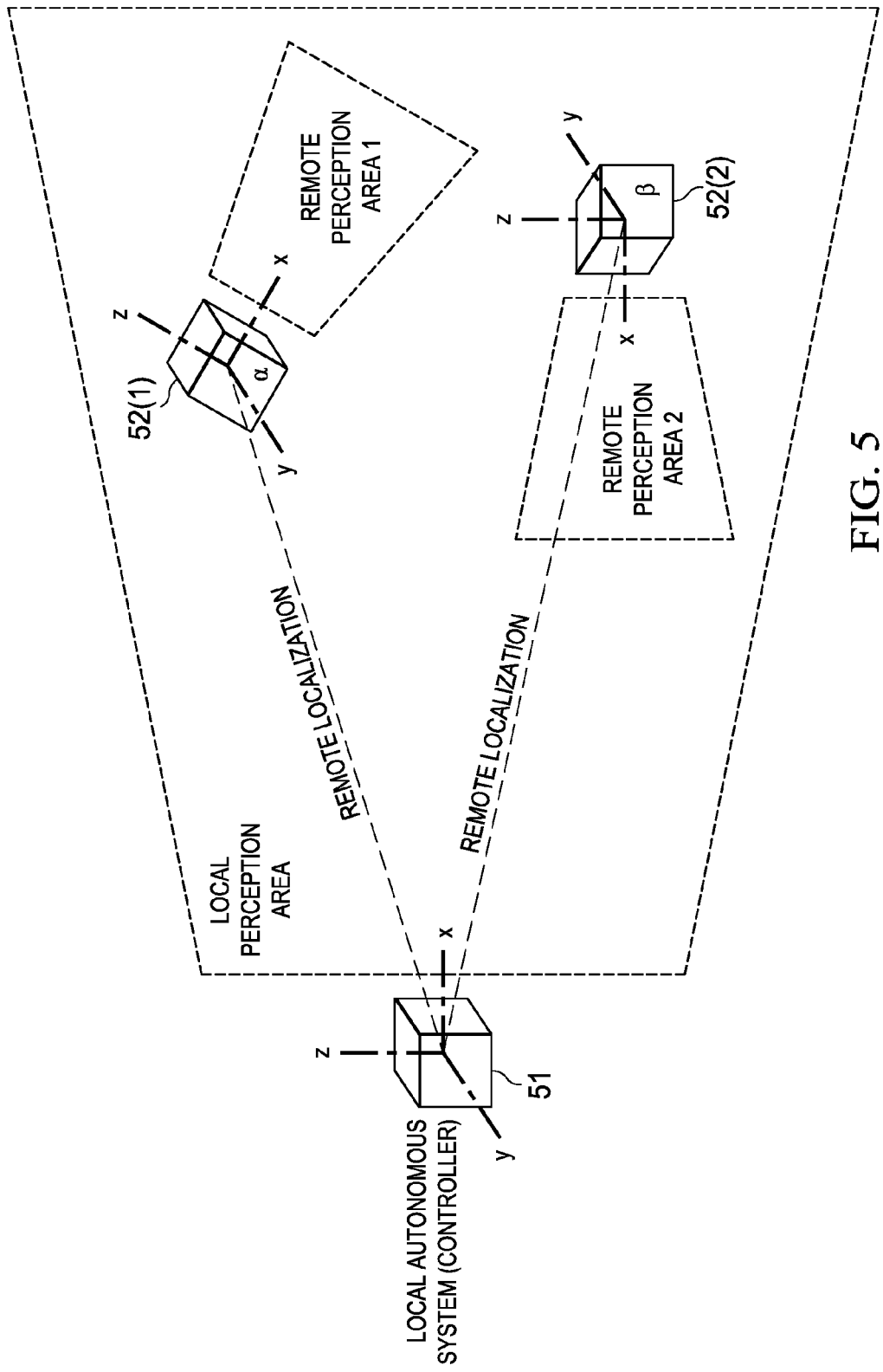
FIG. 5 illustrates the three-dimensional perception areas of an A-GV and two RC-AV's localized and controlled by the A-GV.

FIG. 5 illustrates the three-dimensional perception areas of an A-GV 11 and two RC-AV's 12 controlled by the A-GV. The A-GV 11 and the RC-GV's 12 are identified by their on-board control systems 51 and 52(1) and 52(2), respectively. The localization of the two RC-AVs by the A-AV is also illustrated.

The perception area of the A-GV 11 is illustrated as the larger "local" perception area. The perception areas of the two RC-AV's are illustrated as the smaller "remote" perception areas.

The perception area of the A-GV is forward-looking, ahead of its intended path. A first local perception area looks ahead of the A-GV and down at its forward path. A second local perception area looks back at the A-GV and downward toward its forward path. In this example, collectively, the RC-AV's have at least one field of view that perceives potential obstacles to the RC-AVs, and at least one field of view that perceives potential obstacles to the A-GV. In other embodiments, the task of perceiving potential obstacles of the RC-AVs may be dedicated to the A-GV, and RC-AVs used as a navigation aid to the ground travel of the A-GV.

The control system 51 of the A-GV (also referred to herein as the "controller") determines where it desires the RC-AV's (hereinafter referred to as "controllees") to go.

These paths are based on the mission objectives of the A-GV, such as surveillance of a given geographic area. The RC-AVs may be desired to fly along a path directly in front of the A-GV no matter which path the A-GV takes. This path will provide perception, as shown, from above and in front of the A-GV.

The controller 51 uses the combined perception information to determine a viable path for itself and for all controllees. The controller 51 estimates the position, orientation, and state of each controllee so that the controllee can be localized within the controller's world model and reference frame. The controller 51 is responsible for all object detection and avoidance for the controllee.

Figure 6:
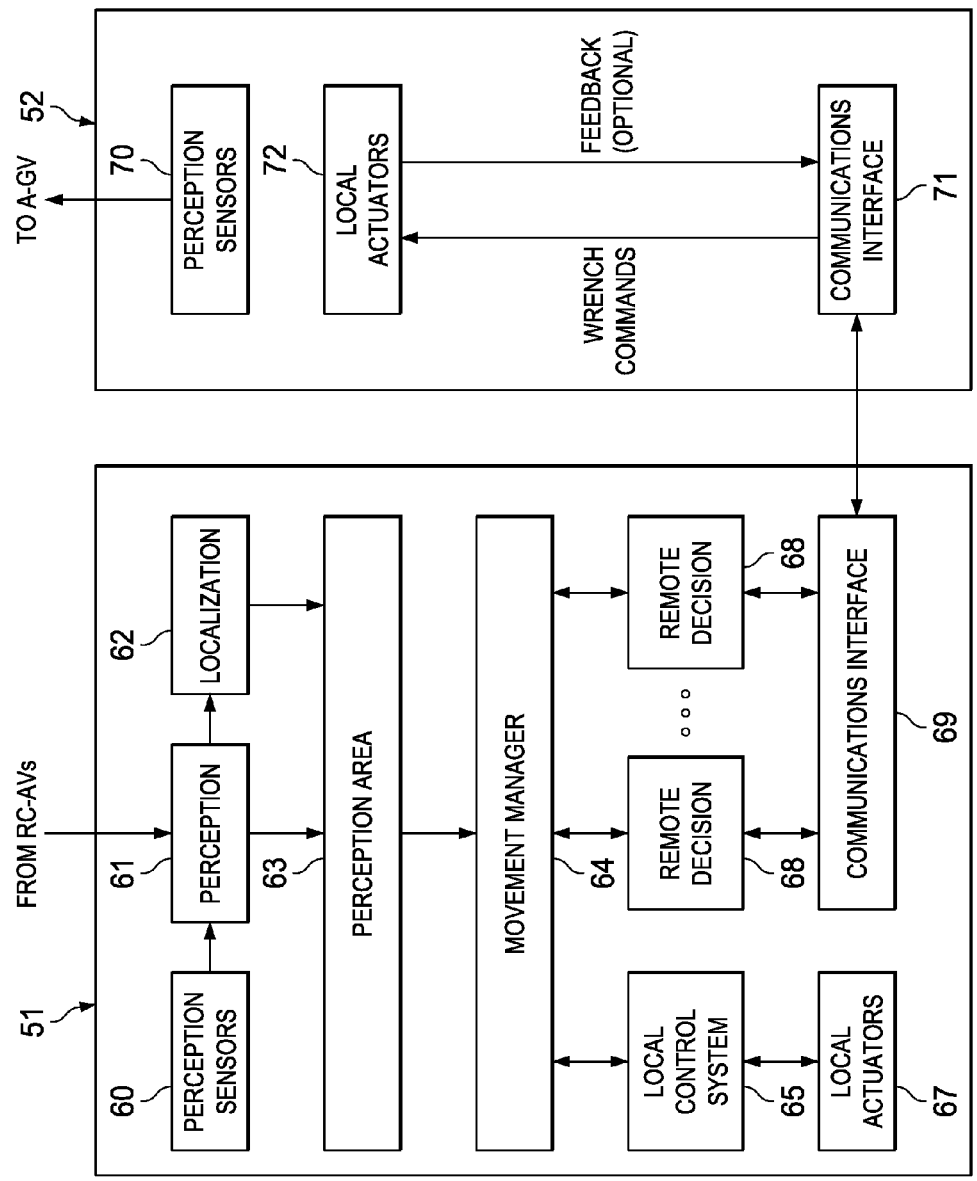
FIGS. 6-8 illustrate the control system of the A-GV 11 and three alternative control systems (wrench, path and goal) of an RC-AV.
Figure 7:
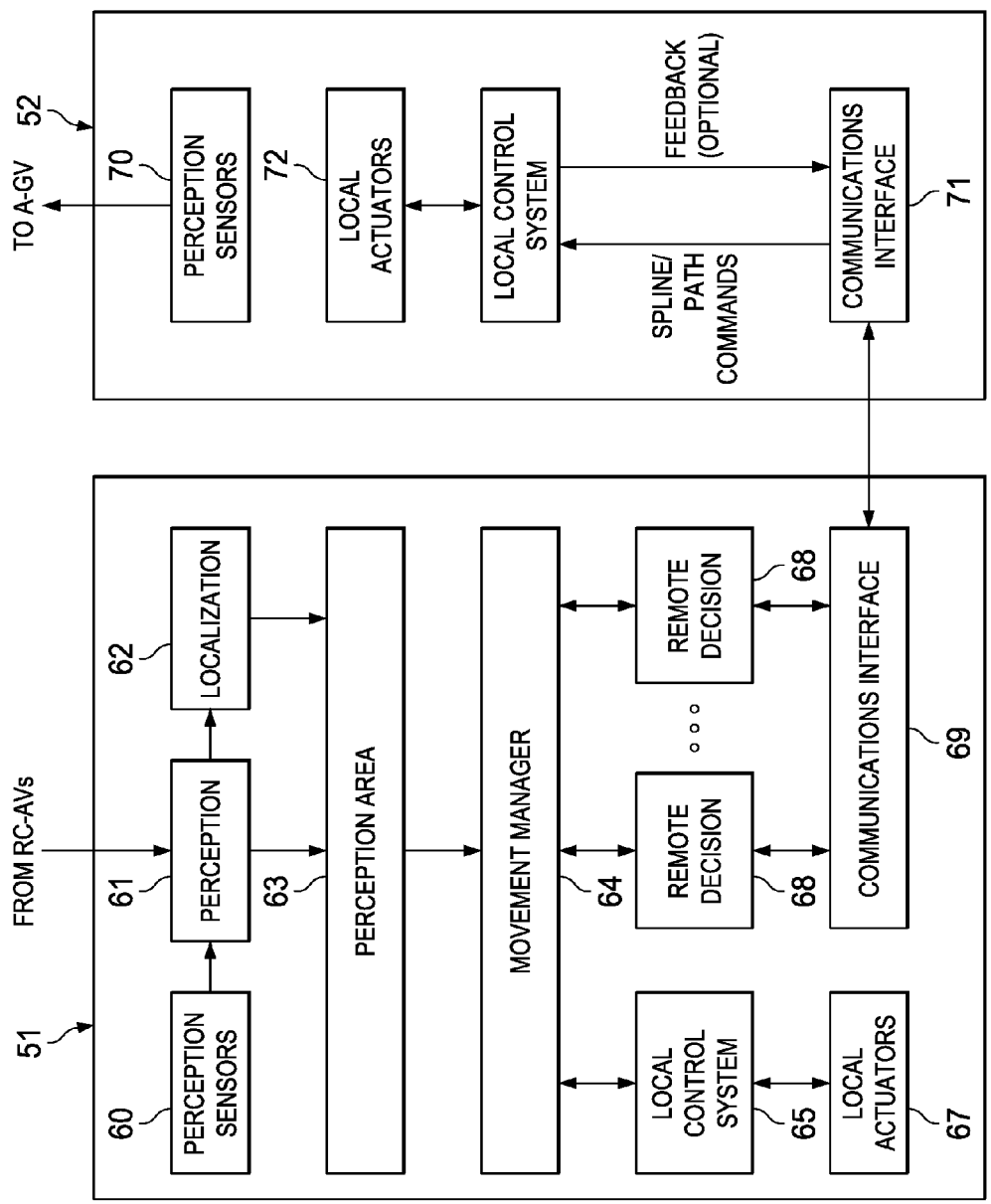
Figure 8:
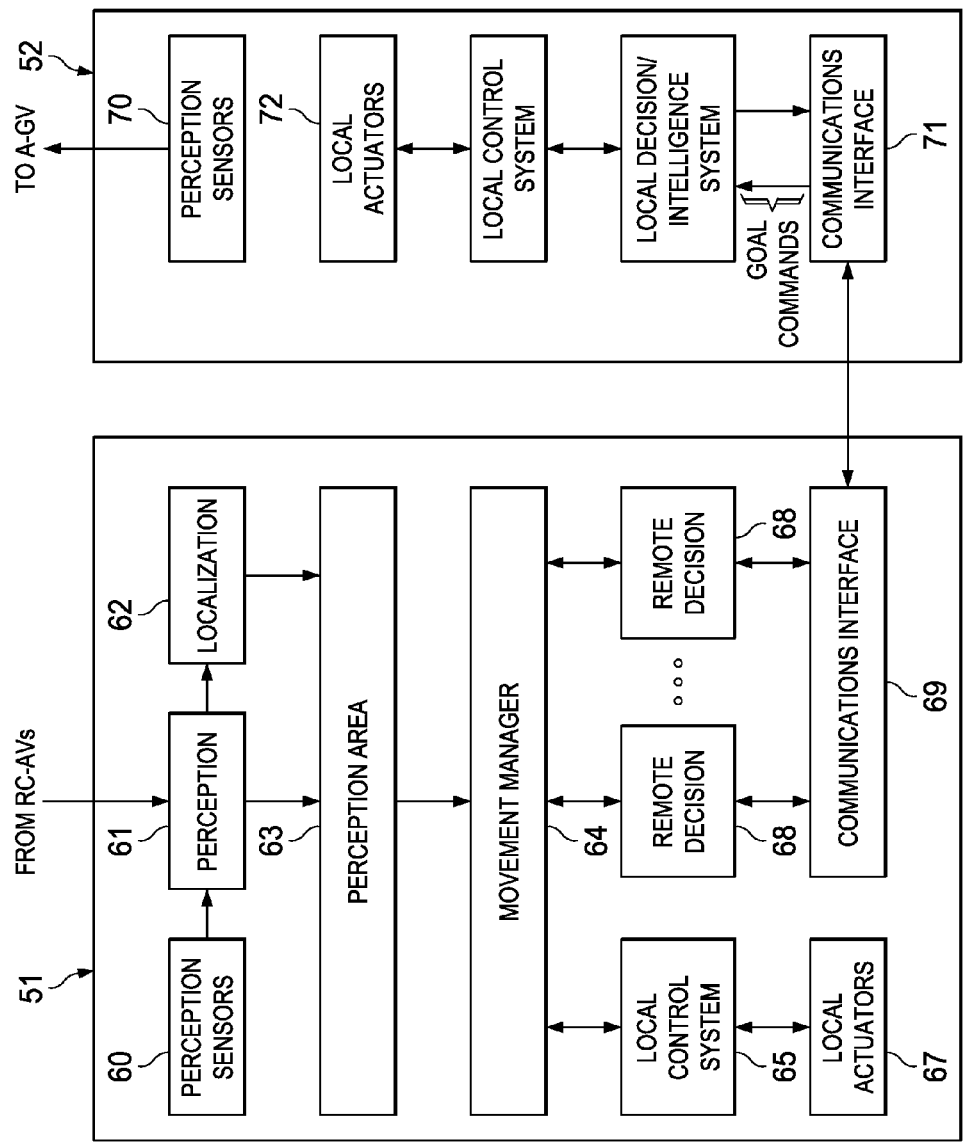

FIGS. 6-8 illustrate the control system 51 of the A-GV 11 and three alternative control systems 52 of an RC-AV 12. It is assumed that both control system 51 and control system 52 have appropriate processor and memory hardware, programmed with software for performing the tasks described herein.

The control system 51 sends wrench (FIG. 6), path (FIG. 7), or goal (FIG. 8) commands to the controllee system 52, based on the configuration of the RC-AV. Wrench, path, and goal command processes are known control techniques for real-time remote control and autonomous systems.

FIG. 6 illustrates a wrench command process. The controller 51 sends wrench commands to the controllee 52.

FIG. 7 illustrates a path (also referred to as spline) command process. The controller 51 sends path segments to the controllee 52. The controllee must then implement the path by translating the path commands into its own wrench commands for its own actuators. This configuration requires lower bandwidth between controller and controllee. However, it requires a higher level of decision-making capability and processing in the controllee.

FIG. 8 illustrates a goal command process. The controller sends goal locations to the local navigation system running on the controllee. The goal may be expressed either as an absolute or relative position. If absolute, the controllee must have an absolute reference sensor, such as GPS. This configuration requires the highest level of intelligence in the controllee. However, it also removes requirements of robust communication between the controller and controllee.

In FIGS. 6-8, the A-GV's controller 51 has a perception process 61, which receives and organizes data from the perception sensors 60 on board the A-GV and from the perception sensors 70 on-board the RC-AVs. As stated above, these sensors can be various types of imaging sensors, such as cameras or ranging sensors, such as LIDAR, RADAR or ultrasonic sensors.

As illustrated in FIGS. 3 and 5, each vehicle's perception sensors provide data representing the environment within their field of view. A combined perception area comprises the fields of view of the A-GV and the RC-AV(s). The field of view of the A-GV extends to each RC-AV so that each RC-AV can be localized.

A localization process 62 performs localization of the controllee(s) by the controller, and is explained below, as are perception area process 63, movement manager process 64, local control 65, and remote decision process(s) 68. Each vehicle has control actuators 67 and 72 as appropriate for the mechanics of that vehicle's movement (ground or flight).

Figure 9:
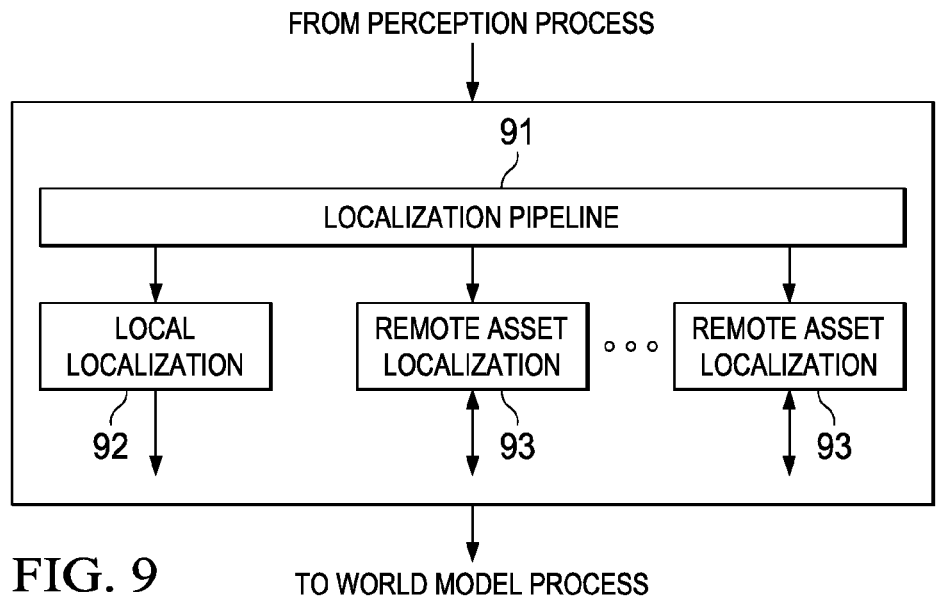
FIG. 9 illustrates the A-GV's localization process in further detail.

FIG. 9 illustrates localization process 62 in further detail. A localization pipeline 92 receives the perception data from the perception process 61.

A local localization process 92 handles localization of the A-GV, and an RC-AV localization process 93 is associated with each RC-AV. All localization processes are in communication with each other via pipeline 91.

The RC-AV localization processes 93 comprise algorithms that use input from the perception process 61 to determine the pose of the individual RC-AVs. Each process 93 determines the position of the associated RC-AV in space relative to the frame of reference of the A-GV. The perception of the RC-AV by the A-GV allows the A-GV to "see" the RC-AV and determine its position.

The localization processes operate in parallel, and deliver their output data to the perception area process 63. Localization provides the position of each vehicle in a map oriented to the A-GV, and is continually updated as the vehicles move.

Figure 10:
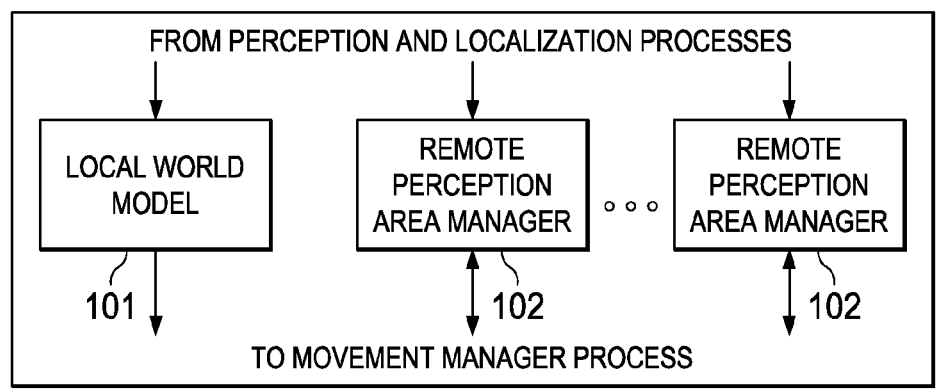
FIG. 10 illustrates A-GV's perception area process in further detail.

FIG. 10 illustrates the perception area process 63 in further detail. A local world model process 101 represents the physical area around the A-GV 11. Each RC-AV has an associated perception area process 102. Each process 102 is not a separate physical world model, but rather a geometric definition of the physical area around the RC-AV that is affected by navigation decisions made by the A-GV. This information is delivered to the movement manger process 64.

Referring again to FIGS. 6-8, the movement manager process 64 implements the actual remote control of the RC-AVs. It coordinates movement of both the A-GV and the RC-AVs based on the mission objective. For example, it may generate commands such that an RC-AV will fly forward of the A-GV based on the planned path of the A-GV. In other words, the movement manager process 64 determines a path for each RC-AV to follow, based on the intended path of the A-GV.

Additionally, the movement manager process 64 may determine a path that is also based on obstacles perceived by the either the A-GV or an RC-AV. For example, the perception area developed by process 63 may include an obstacle in the environment of the RC-AV. The movement manager process 64 will define a path for the RC-AV that does not cause collision with this obstacle.

The movement manager process 64 also determines the path of the A-GV, based on the combined perception area developed by process 64. As described above in connection with FIGS. 1-3, the perception area will include potential obstacles for the A-GV, and the movement manager process 64 will direct the A-GV on a path that will avoid them.

Via the communications interface 69, the movement manager process 64 then delivers its commands to the RC-AVs. The RC-AVs each have an on-board communications interface 71, and translate the commands into appropriate instruction sets based on the particular control configuration (wrench, path, or goal) of the RC-AV.

The communications interfaces 69 and 71 need not be bi-directional, but can be unidirectional, from the A-GV to the RC-AVs. This communications link can follow a defined protocol for a single communications pipeline or can be accomplished using multiple communication pipelines (wireless radio systems).

As indicated in FIGS. 6-8, the perception sensor payloads 70 on the RC-AVs use a separate communications pipeline from that of the communications interface 69. This allows the perception sensors on the RC-AVs to contribute to the localization and perception area processes on-board the A-GV.

Each RC-AV receives commands that control its speed and direction. Local actuator systems 72 for flying the RC-AV are known in the field of remote control aircraft.

The above-described system enables a single A-GV to remotely control one or more RC-AVs without human interaction. The same concepts can be extended to any autonomous vehicle (ground, air, surface, or underwater) that controls one or more remote vehicles (ground, air, surface, or underwater).

What is claimed is:

1. An unmanned vehicle system, comprising:
at least one autonomous ground vehicle operable to autonomously navigate across ground on a surface of the earth in a direction of travel;
wherein the autonomous ground vehicle has a set of on-board on-ground perception sensors, which have a field of view that contains at least a portion of the ground ahead of the autonomous ground vehicle in its a direction of travel;
wherein the autonomous ground vehicle further has an on-board on-ground control system;
at least one remote controlled aerial vehicle operable to fly in an aerial path in response to flight commands received from the on-board on-ground control system;
wherein the aerial vehicle has a communications interface for receiving the flight commands;
wherein the aerial vehicle carries in-sky perception sensors having a field of view that contains at least a portion of a ground path to be followed by the autonomous ground vehicle
wherein the field of view of the on-board on-ground perception sensors further contains the aerial vehicle;
where the on-board on-ground control system further has a perception process that receives perception data from the on-board on-ground perception sensors and perception data from the in-sky perception sensors, and further has a localization process that uses the perception data to locate the aerial vehicle in a frame of reference of the autonomous ground vehicle, and further has a perception area process that combines the perception data; and
further has a movement manager process that uses the combined perception data to determine the ground path for the autonomous ground vehicle and an aerial path for the aerial vehicle;
wherein the movement manager process calculates at least part of the ground path in response to perception data from the in-sky perception sensors, and further calculates at least part of the aerial path in response to perception data from the on-board on-ground perception sensors.

2. The system of claim 1, wherein at least some of the perception sensors are imaging cameras.

3. The system of claim 1, wherein at least some of the perception sensors are ultrasonic sensors.

4. The system of claim 1, wherein at least some of the perception sensors are radar or lidar sensors.

5. The system of claim 1, wherein the autonomous ground vehicle communicates with the aerial vehicle via wi-fi.

* * * * *